(12) United States Patent
Sonehara

(10) Patent No.: US 7,233,441 B2
(45) Date of Patent: Jun. 19, 2007

(54) STEREOSCOPIC DISPLAY

(75) Inventor: Tomio Sonehara, Suwa (JP)

(73) Assignee: Seiko Epson Corporation, Tokyo (JP)

( * ) Notice: Subject to any disclaimer, the term of this patent is extended or adjusted under 35 U.S.C. 154(b) by 45 days.

(21) Appl. No.: 10/268,982

(22) Filed: Oct. 11, 2002

(65) Prior Publication Data

US 2003/0086167 A1 May 8, 2003

(30) Foreign Application Priority Data

Oct. 11, 2001 (JP) ............................. 2001-313952
Dec. 26, 2001 (JP) ............................. 2001-395396

(51) Int. Cl.
*G02B 27/22* (2006.01)

(52) U.S. Cl. ..................................... 359/462

(58) Field of Classification Search ................ 359/462, 359/463; 353/7; 345/7
See application file for complete search history.

(56) References Cited

U.S. PATENT DOCUMENTS

| | | | |
|---|---|---|---|
| 2,628,533 A | 2/1953 | Oetjen | |
| 3,647,284 A | 3/1972 | Elings et al. | |
| 4,431,280 A * | 2/1984 | Carvelo | 352/58 |
| 4,943,851 A * | 7/1990 | Lang et al. | 348/37 |
| 4,979,026 A * | 12/1990 | Lang et al. | 348/816 |
| 5,036,385 A * | 7/1991 | Eichenlaub | 348/59 |
| 5,302,965 A * | 4/1994 | Belcher et al. | 345/31 |
| 5,508,763 A | 4/1996 | Schulte | |
| 5,600,388 A * | 2/1997 | Anderson | 396/324 |
| 5,678,910 A * | 10/1997 | Martin | 353/7 |
| 5,767,822 A * | 6/1998 | Hiroshi | 345/46 |
| 5,782,547 A * | 7/1998 | Machtig et al. | 353/28 |
| 5,977,938 A | 11/1999 | Iwasa | |
| 6,183,088 B1 * | 2/2001 | LoRe et al. | 353/7 |

(Continued)

FOREIGN PATENT DOCUMENTS

GB 2054901 A * 2/1981

(Continued)

OTHER PUBLICATIONS

Endo et al., "A Cylindrical 3-D Display Observable from All Directions", 3D Image Conference, Paper No. 4-4, 1999.

(Continued)

*Primary Examiner*—Drew A. Dunn
*Assistant Examiner*—Joshua L. Pritchett
(74) *Attorney, Agent, or Firm*—Oliff & Berridge, PLC.

(57) ABSTRACT

The invention provides a stereoscopic display to display a high-quality three-dimensional video which can be viewed without using polarizing glasses. A stereoscopic display according to the present invention includes an electronically-formed, multi-viewpoint light beam group and an image-forming device to reproduce a conjugate image of the multi-viewpoint light beams. The stereoscopic display further includes a cylindrical, or partially cylindrical parallax barrier and a rotating light-emitting array as a multi-viewpoint-light-beam forming device. In addition, the stereoscopic display further includes a polarizing element and a polarization separation device to increase the display contrast. The numerical aperture of the rearmost optical element is preferably increased in order to increase the viewing area, and a reflective optical element with a large aperture is used as the image-forming device. The light-emitting array is formed of lightweight, thin-film light-emitting elements with which electronic rotational scanning is possible.

16 Claims, 13 Drawing Sheets

U.S. PATENT DOCUMENTS

| | | | |
|---|---|---|---|
| 6,335,714 B1 * | 1/2002 | Wang | 345/82 |
| 6,335,838 B1 | 1/2002 | Kasai et al. | |
| 6,375,326 B2 * | 4/2002 | Myers | 353/10 |
| 7,002,532 B2 | 2/2006 | Suyama et al. | |
| 2003/0020879 A1 * | 1/2003 | Sonehara | 353/7 |

FOREIGN PATENT DOCUMENTS

| | | |
|---|---|---|
| JP | A-5-210078 | 8/1993 |
| JP | 07147431 A * | 6/1995 |
| JP | A-09-305302 | 11/1997 |
| JP | A-10-074052 | 3/1998 |
| JP | A-10-097013 | 4/1998 |
| JP | A-2000-010041 | 1/2000 |
| JP | A-2000-075816 | 3/2000 |
| JP | A-2000-137192 | 5/2000 |
| JP | A-2000-214413 | 8/2000 |
| JP | A-2000-241750 | 8/2000 |
| JP | A-2001-177784 | 6/2001 |

OTHER PUBLICATIONS

Jones, "Invited Paper: Active Matrix OLED Microdisplays", Society of Information Display (SID) Digest, pp. 134-137, 2001.

Rajeswaran et al., "Invited Paper: Active Matrix Low Temperature Poly-Sci TFT / OLED Full Color Displays: Development Status", Society of Information Display (SID) Digest, pp. 974-977, 2000.

Wortman, "A Recent Advance in Reflective Polarizer Technology", International Display Research Conference, pp. M-98-M-106, 1997.

Nakanowatari, "Polarization split system polarizing plate with high transmissivity by applying a cholesteric liquid crystal", Ekisho, vol. 2, No. 2, pp. 32-39, 1998.

Gardner et al., An Improved Polarizing Beamsplitter LCOS Projection Display Based on Wire-Grid Polarizers, Society of Information Display (SID) Digest, pp. 1282-1289, 2001.

"Molecular Electronics and Bioelectronics", M&BE, vol. 10, No. 1, pp. 63-69, 1999.

English-language translation of: Endo et al., "A Cylindrical 3-D Display Observable from All Directions", 3D Image Conference. 1999, Paper No. 4-4.

English-language translation of: Tokito et al., "Micro-Light Resonator Type Organic Electroluminescent Devices and Their Application to Liquid Crystal Projectors". Molecular Electronics and Bioelectronics (M&BE) Workshop. 1999, vol. 10, No. 1, pp. 63-69.

Tomohiro Endo et al., "A Cylindrical 3-D Display Observable from All Directions," 3D Image Conference, 1999, p. 110 (Abstract only).

* cited by examiner

STEREOSCOPIC DISPLAY

BACKGROUND OF THE INVENTION

1. Field of the Invention

The present invention relates to parallax stereoscopic displays. More specifically, the invention relates to a stereoscopic display to display a color 3-dimensional moving image which can be viewed without using polarizing glasses or liquid crystal shutters.

2. Description of the Related Art

Conjugate-image-reproducing stereoscopic displays using concave mirrors or convex lenses, which are disclosed in U.S. Pat. Nos. 2,628,533, 3,647,284, and 5,508,763, can be used to display stereoscopic images easily.

The related art also includes stereoscopic displays known as "binocular type" displays. In addition, a display in which multi-viewpoint light beams are generated by rotational scanning so that an image can be seen from 360 degrees is disclosed in 3D Image Conference 1999, Paper No. 4—4.

SUMMARY OF THE INVENTION

However, in the related art conjugate-image-reproducing stereoscopic displays, since a conjugate image of a real object is reproduced, the real object to be projected must be prepared. Accordingly, electronic stereoscopic videos including moving images cannot be displayed.

In addition, in the method of reproducing the multi-viewpoint light beams around the entire periphery, since a cylindrical barrier is disposed around the space in which the stereoscopic image is formed, it is not possible for viewers to enter the display space. Therefore, it is difficult to provide a haptic interface and interactiveness with the viewers is limited. In addition, due to the existence of a parallax barrier and a protective cover which is necessary to prevent the viewers from directly touching a rotator and slits, it has been impossible to form a stereoscopic image in the true sense.

In order to address or solve the above-described problems, the present invention provides a stereoscopic display to display high-quality three-dimensional video, or an image, which can be viewed without using polarizing glasses, etc.

In order to address or attain the above-described advantage, a stereoscopic display according to the present invention includes a multi-viewpoint-light-beam-group generating device which generates an electronically-formed, multi-viewpoint light beam group and an image-forming device which reproduces a conjugate image of a stereoscopic image formed by the multi-viewpoint light beam group.

The stereoscopic display of the present invention is a conjugate-image-reproducing stereoscopic display in which an image-forming device forms a stereoscopic image of electronically generated, multi-viewpoint light beams, and then reproduces a conjugate image of the stereoscopic image. The conjugate image is observed by viewers.

According to this construction, a display area and a rotational scanning system and can be optically separated from each other, so that the stereoscopic moving image or video can be electronically reproduced in space where no real object exists. In addition, many people are able to view the stereoscopic image without using polarizing glasses at the same time.

In addition, according to the present invention, a rearmost optical element in the image-forming device which forms the conjugate image is a reflective optical element.

In order to increase the viewing area, the numerical aperture of the rearmost optical element is preferably increased. By using the reflective optical element as the rearmost optical element, the viewing area can be increased within a reasonable cost. In addition, since it is necessary to fold the light path in a reflective system, there is also an advantage in that the overall size of the display can be reduced.

In addition, according to the present invention, the image-forming device is an optical system including a polarizing element which polarizes light which serves to form the conjugate image and a polarizing element which selects display light.

Light which enters the image-forming system includes not only light used to form the multi-viewpoint light beam group, but also external light and multiple reflection light. If the light emitted from the multi-viewpoint light beams is polarized and is selected, or detected, at a certain position in the image-forming optical system, the above-mentioned noise light can be reduced. In addition, at least half of external light which enters from the observer side can be absorbed, so that a high-contrast conjugate image can be obtained.

In addition, according to the present invention, the image-forming device includes a rearmost optical element formed of a concave mirror, a polarizing element which is formed of a polarization separation mirror and which selects the display light, and a polarization rotation element which rotates polarized light reflected by the concave mirror.

In a more-advanced reflective image-forming optical system, the viewing area is enlarged by the concave mirror and the polarization separation mirror separates the light incident from the multi-viewpoint light beams from the emission light used to form the conjugate image by utilizing the polarization thereof. A phase plate, etc., is used to rotate the reflected polarized light. According to this construction, a black background is obtained due to the absorption by a black box, so that a high-contrast conjugate image can be observed. The concave mirror preferably has a large diameter.

In addition, according to the present invention, the multi-viewpoint-light-beam-group generating device includes a cylindrical parallax barrier and a rotating cylindrical light-emitting array.

More specifically, the multi-viewpoint light beam group viewed by an observer is sequentially formed by time-sharing the rotating cylindrical light-emitting array in correspondence with slit positions of the parallax barrier. Accordingly, a high-definition, high-quality multi-viewpoint light beam group can be formed with a small number of light-emitting-array elements.

In addition, according to the present invention, the multi-viewpoint-light-beam-group generating device includes a partially cylindrical parallax barrier in which a viewing direction is limited and a partially-rotating cylindrical light-emitting array.

More specifically, the multi-viewpoint light beam group viewed by an observer is formed by time-sharing the partially-rotating cylindrical light-emitting array in correspondence with slit positions of the parallax barrier in which the viewing direction is limited.

Accordingly, electronic scanning can be used in place of mechanical scanning. In addition, the viewing direction can be limited and a high-display-density stereoscopic image can be obtained.

In addition, according to the present invention, the cylindrical light-emitting array includes array elements formed of thin-film light-emitting elements.

Accordingly, even when the number of pixels is increased, a lightweight light-emitting array which is sufficiently resistant to the rotational scanning can be obtained.

Alternatively, according to the present invention, the cylindrical light-emitting array includes array elements formed of thin-film organic light-emitting diodes.

Accordingly, the weight can be reduced and pixel density can be increased. In addition, a color display can be easily obtained. From these points of view, a matrix display including luminous thin-film organic light emitting diodes is suitable.

In addition, according to the present invention, the cylindrical light-emitting array is driven by a display signal obtained by optical transmission.

Accordingly, stable display data can be supplied to rotating driving circuits.

In addition, according to the present invention, the cylindrical light-emitting array is provided with optical louvers which limit the direction of light emission.

In order to avoid crosstalk between the multi-viewpoint light beams, it is necessary to eliminate light leaks from between adjacent barrier slits. Therefore, the optical louvers are provided to emit narrow light beams.

In addition, according to the present invention, the cylindrical light-emitting array is provided with a polarizing element used to emit polarized light.

By polarizing the multi-viewpoint light beams, display light can be easily separated from noise light having a different polarization and contrast of the conjugate image can be increased.

In addition, according to the present invention, the exterior of the cylindrical light-emitting array is covered or sealed with black resin except for regions where light-emitting-array elements are formed.

Accordingly, stray light and noise light can be absorbed and wind noise caused by rotational scanning can be suppressed.

In addition, according to the present invention, the cylindrical light-emitting array is rotated electronically Accordingly, all or a part of rotational scanning can be replaced by electronic scanning using line scanning of the light-emitting array. Therefore, vibration-free rotational scanning can be provided with high reliability.

In addition, according to the present invention, the cylindrical light-emitting array includes nonluminous spatial light modulators and a projection light source.

Accordingly, the density of the multi-viewpoint light beams can be further increased.

In addition, according to the present invention, an image signal applied to the cylindrical light-emitting array is a multi-viewpoint light beam signal having 180-degree axial symmetry with respect to a rotational axis of the cylindrical light-emitting array.

Since the conjugate image has 180-degree symmetry with respect to the multi-viewpoint light beam group, when the observer views the conjugate image from the front, the observer sees the rear side view of the stereoscopic image. This can be corrected by applying the multi-viewpoint light beam signal having 180-degree axial symmetry.

In addition, according to the present invention, the cylindrical parallax barrier is provided with optical louvers.

In order to avoid crosstalk between the multi-viewpoint light beams, it is necessary to eliminate light leaks from between adjacent barrier slits. Therefore, the optical louvers are provided to emit narrow light beams.

In addition, according to the present invention, the cylindrical parallax barrier is rotated such that the effective slit pitch is changed.

Accordingly, the number of slits, that is, the number of horizontal pixels, can be increased by reducing the effective pitch. Therefore, a stereoscopic moving image with increased definition can be obtained.

Accordingly, the stereoscopic display of the present invention is able to reproduce a high-quality stereoscopic moving image in space. More specifically, the present invention provides a stereoscopic display which is capable of displaying a natural, color-filled, stereoscopic moving image providing a feeling which can also be reproduced.

DETAILED DESCRIPTION OF PREFERRED EMBODIMENTS

Embodiments of the present invention will be described below with reference to the accompanying drawings.

First Embodiment

Figure 1:
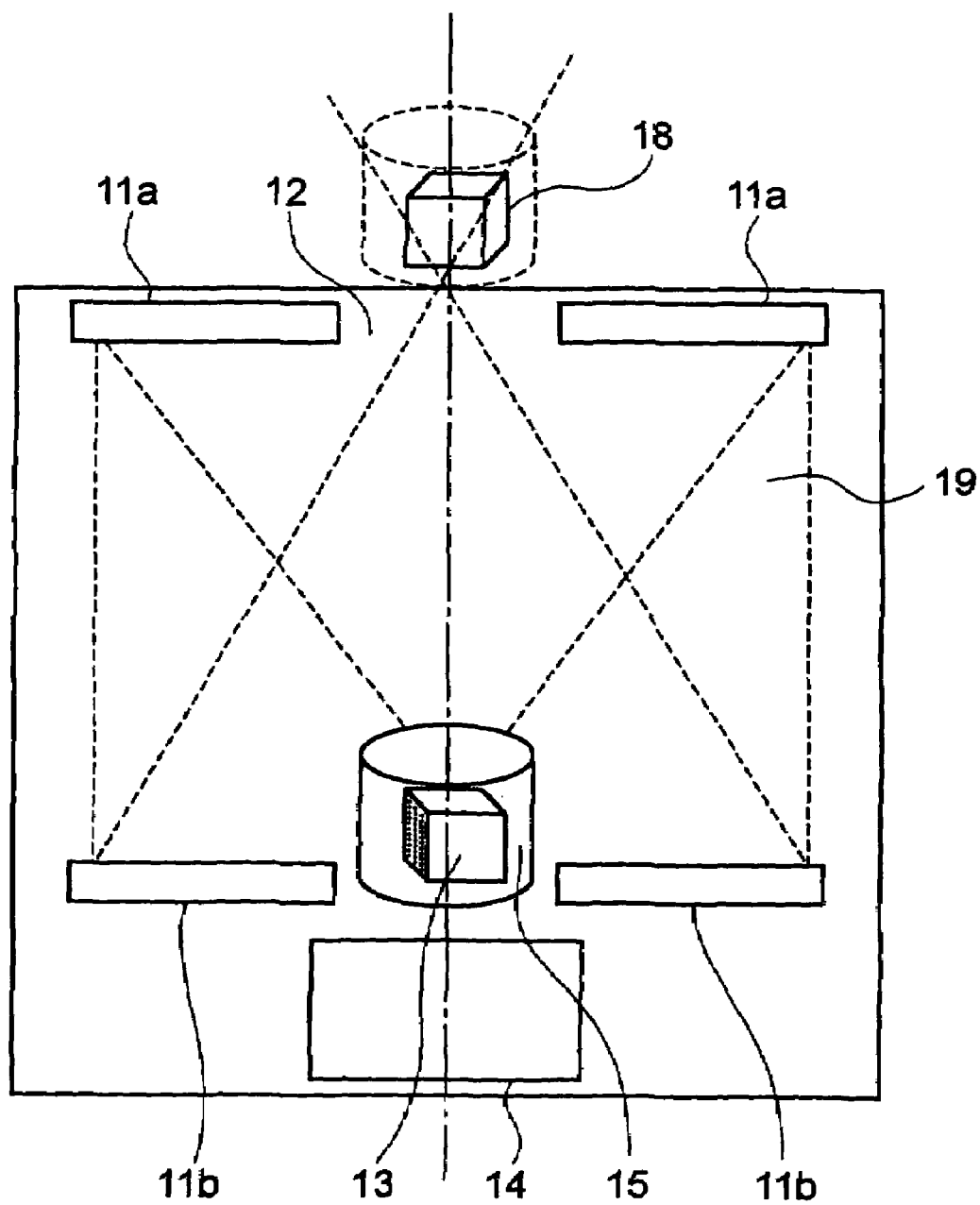
FIG. 1 is a schematic showing a stereoscopic display according to a first embodiment of the present invention.

FIG. 1 is a schematic showing a construction in which a reflective image-forming optical system is used as an image-forming device and a cylindrical parallax barrier 15 and a rotating cylindrical light-emitting array are used together as a multi-viewpoint-light-beam forming device.

In the reflective image-forming system, two Fresnel mirrors 11a and 11b, which are reflective optical elements which serve as convex lenses, are disposed such that the Fresnel mirrors 11a and 11b oppose each other. Apertures 12 are formed in the Fresnel mirrors 11a and 11b at the central regions thereof. A stereoscopic image 13, which is reproduced by a multi-viewpoint light beam group formed by the light-emitting array and the cylindrical parallax barrier 15, is placed close to the lower aperture, and a conjugate image 18 is formed at a position close to the upper aperture. Accordingly, the conjugate image 18, which is to be observed by a viewer, is formed by the lower Fresnel mirror 11b, which is a reflective optical element. The dashed line 19 shows the light beams at the peripheral edge and the dotted chain line shows the optical axis. More specifically, in the present embodiment, large Fresnel mirrors for reflective overhead projectors (OHPs) having the same focal length are used. In addition, thin-film light-emitting elements, which will be described below, are used to form the light-emitting array, and a phase-locked loop (PLL) controlled direct current (DC) motor is used as a rotational scanning device 14. Although the multi-viewpoint light beam group is actually a collection of slit-shaped light beams, it is shown in a cubic shape in order to facilitate understanding of the image formation.

Figure 2:
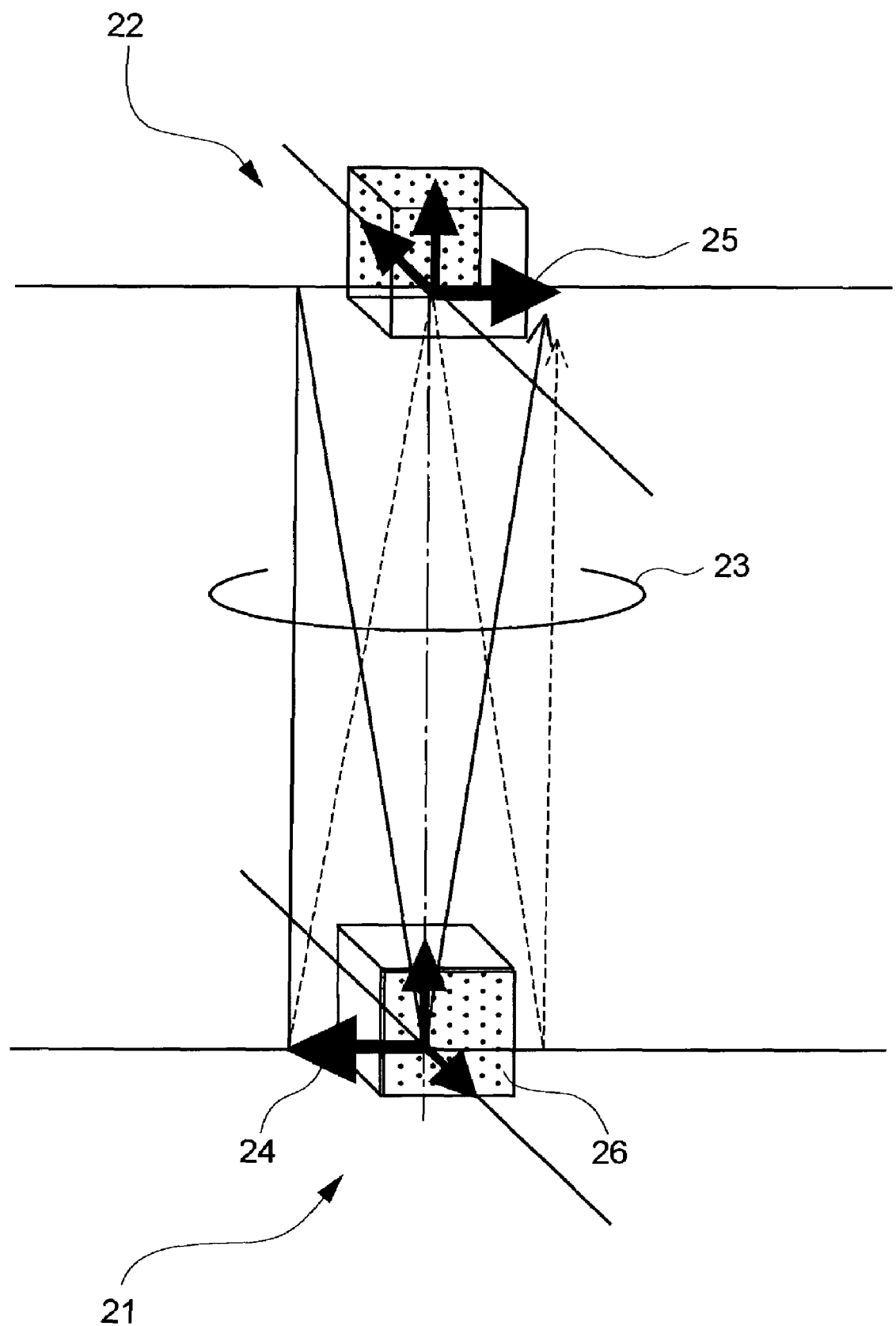
FIG. 2 is a perspective view showing a manner in which a stereoscopic image is inverted in the stereoscopic display.

When the reflective image-forming optical system shown in FIG. 1 is used, the reproduced stereoscopic image 13 and the conjugate image 18 are inverted with respect to each other in the front-back and right-left directions. This will be explained with reference to FIG. 2. In FIG. 2, xyz coordinate systems are defined at the lower side 21 and the upper side 22 at positions where the Fresnel mirrors are disposed. A parallax image is placed at the origin of the lower coordinate system, and a conjugate image is formed at the origin of the upper coordinate system. When arrows extending along the x, y, and z axes are provided in the lower coordinate system, as shown in FIG. 2, the conjugate image of the arrows formed at the upper side extend along the opposite directions with respect to the x and y axes. For example, the arrow 24 on the y axis forms the arrow 25 which is conjugate thereto. Reference numeral 23 shows light beams emitted from the end point of the arrow 24 in the paraxial approximation. The foregoing explanation also applies to the arrow extending along the x axis. Accordingly, a surface 26 of the cube is inverted as shown in FIG. 2. However, as is clear from FIG. 2, the conjugate image appears identical to the original image when it is viewed from the 180-degree opposite direction in the horizontal plane.

Figure 3:
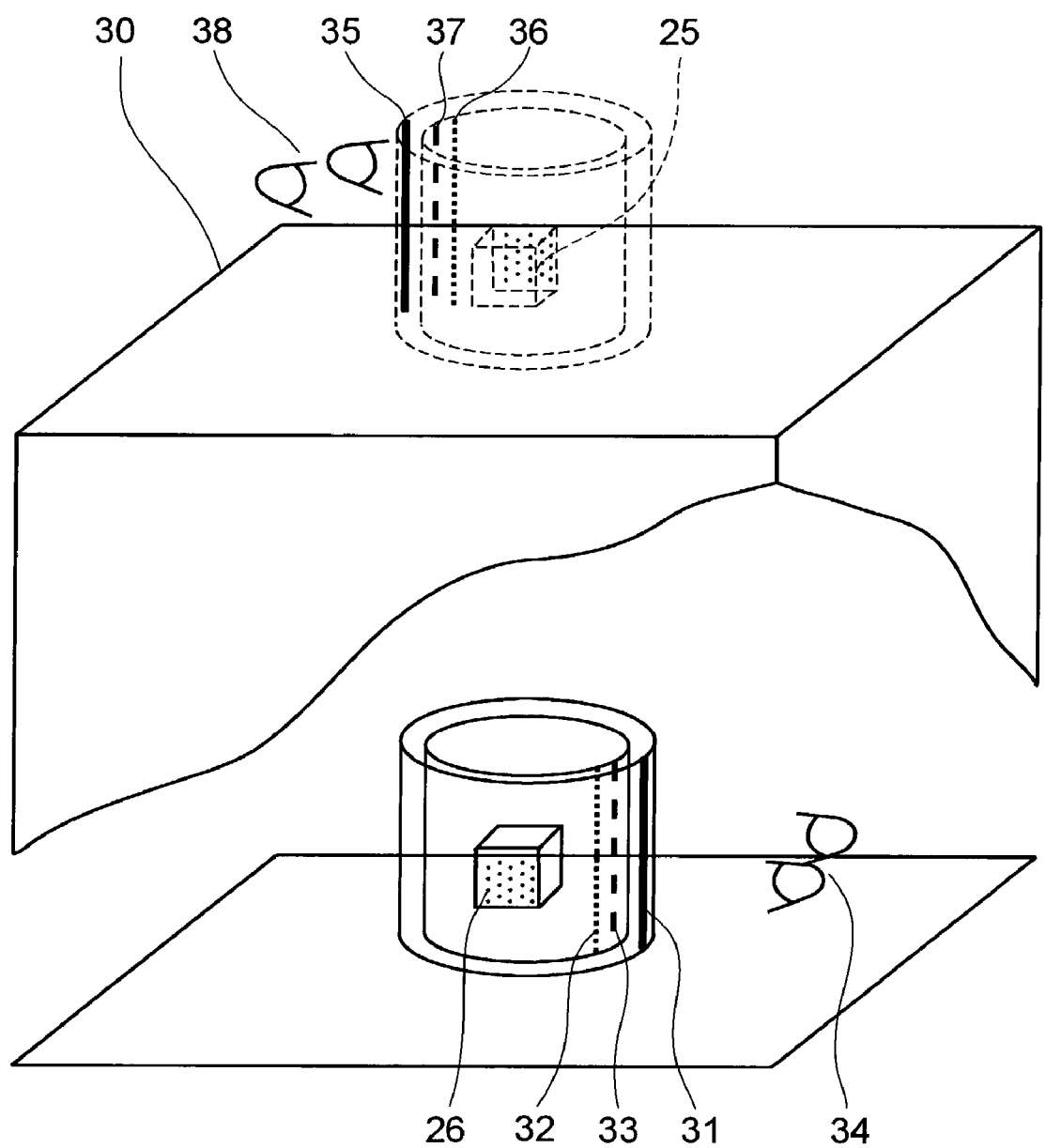
FIG. 3 is a perspective view showing a manner in which a parallax barrier and multi-viewpoint light beam source are inverted in the stereoscopic display.

FIG. 3 is a schematic showing the inverse relationship between slits and the light-emitting array, which is the source of the multi-viewpoint light beams. When a stereoscopic image formed in a stereoscopic display 30 according to the present embodiment is viewed from a view point 34, the observer views a right light-emitting-array element 32 and a left light-emitting-array element 33 through a slit 31. Accordingly, the stereoscopic image 26 is observed. The conjugate images of the slit, the right light-emitting-array element, and the left light-emitting-array element are formed as indicated by 35, 36, and 37, respectively, by the reflective image-forming optical system shown in FIGS. 1 and 2. When these components are observed from a view point 38, due to the inversion in the x and y directions, a stereoscopic conjugate image 25 having 180-degree rotational symmetry with respect to the stereoscopic image 26 about the z axis can be observed. Therefore, when a video signal having 180-degree axial symmetry with respect to an original video signal is applied to the light-emitting array, a desired parallax image directly facing the observer can be obtained.

Since the stereoscopic image 25 is of course an optical image which does not actually exist, a pointing device can be inserted without being impeded by the barrier slits and the light-emitting array. Accordingly, it is possible to point at the stereoscopic image freely. In addition, since the stereoscopic image is formed by using the multi-viewpoint light beam group, so-called phantom images, in which background objects appear translucent, are not displayed as in stereoscopic images formed by using volumetric scanning techniques.

Figure 4:
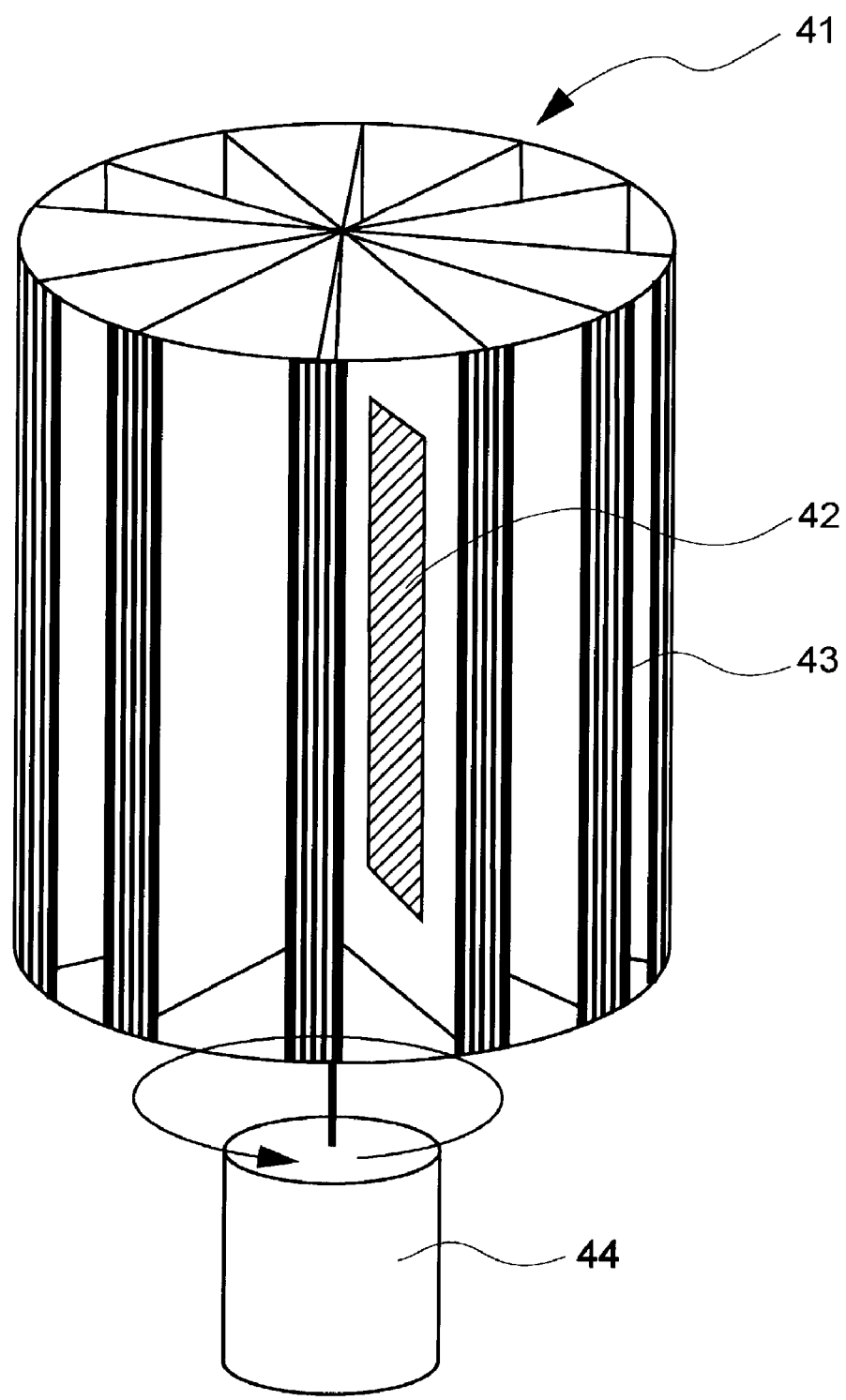
FIG. 4 is a schematic perspective view showing a light-emitting array of the stereoscopic display.

FIG. 4 is a schematic perspective view of the light-emitting array used in the present embodiment. A plurality of driving circuits 42 and light-emitting-array elements 43 are provided on a cylindrical rotator 41 in a radial manner around the axis of the rotator 41. The light-emitting-array elements are formed of thin-film light-emitting elements. More specifically, they are formed of active-matrix, thin-film, organic light emitting diode (OLED) displays including red (R), green (G), and blue (B) subpixels. In FIG. 4, only one driving circuit for one of the light-emitting-array elements is shown. In the present embodiment, polymer OLED displays driven by polysilicon thin-film transistors (p-Si TFT) are used. A single light-emitting-array element includes 768×128 pixels, and twelve light-emitting-array elements are disposed at the periphery of the cylindrical body. The diameter of the cylindrical light-emitting array is 70 mm and the pixel pitch is 100 μm. Accordingly, a multi-viewpoint light beam group having a maximum size of 70 mm in height and 70 mm in width can be obtained. The OLED pixels are arranged in an RGB-delta configuration. In effect, they correspond to 150 μm white pixels. The parallax number is 50. Alternatively, Si-transistor-driven devices described in Society of Information Display (SID) Digest 2001, p. 134, or TFT-driven devices described in SID Digest 2000, p. 974, may also be used. A high-definition OLED array in which the pixel pitch is less than 100 μm, or a large OLED array having a large number of pixels may also be obtained. In addition, since the thin-film elements are used, the weight can be reduced even when a substrate is used. This is very advantageous for a device which can be or must be moved, as in the present invention.

The cylindrical light-emitting array 41 is driven by a motor 44 connected to a central shaft of the cylindrical body. Display signals to be applied to each of the light-emitting-array elements are transmitted to each of the driving circuits by optical transmission using a light transceiver which is disposed close to a rotating drive shaft.

The light-emitting-array elements must emit light in the vertical direction along the rotating shaft in order to avoid crosstalk between the multi-viewpoint light beams. Accordingly, the direction of light emission is limited by providing optical louvers for the light-emitting-array elements on slits of the parallax barrier. In the present embodiment, a microlouver film (produced by 3M) is disposed on the light-emitting-array elements, so that light emission in directions other than the direction perpendicular to the periphery of the cylindrical body is restricted. Alternatively, when the OLED elements are used, a resonator structure described in Molecular Electronics and Bioelectronics (M&BE), Vol. 10, p. 63 (1999) may also be used to limit the direction of light emission. In order to suppress wind noise and stray light, the exterior of the cylindrical light-emitting array is covered or sealed with black resin except for regions where the light-emitting-array elements are formed.

Figure 5:
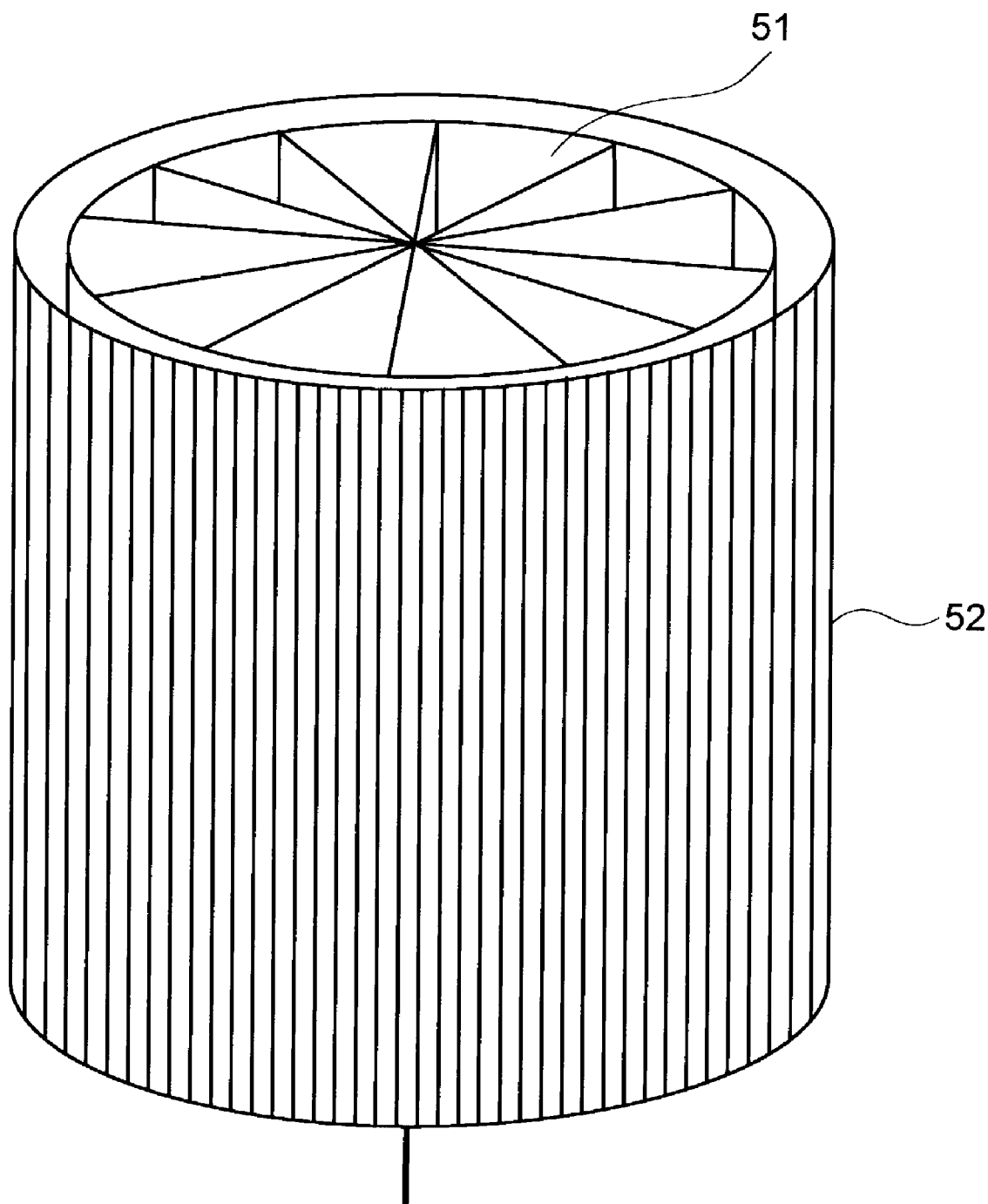
FIG. 5 is a schematic showing a construction of the rotating light-emitting array and the parallax barrier in the stereoscopic display.

FIG. 5 is a perspective view that shows a rotating light-emitting array 51 and a parallax barrier 52 disposed around the rotating light-emitting array 51. The width of slits formed in the parallax barrier is 0.2 mm and the slit pitch is 2 mm. In addition, the diameter of the parallax barrier is 80 mm, and the number of slits is 128. In order to reduce or avoid flickering, the rotational speed of the light-emitting array is set to 200 rpm. While the rotating light-emitting array disposed inside the parallax barrier rotates, the light-emitting-array elements successively emit the multi-viewpoint light beams when they reach positions in front of predetermined slits. Accordingly, right and left multi-viewpoint light beams can be observed through the slits. The drive/video signals for the light-emitting-array elements are transmitted to optical receivers disposed on or over driving substrates from light emitting diodes (LED) disposed on or over a supporting substrate by optical transmission. In order not to impede the rotation, the optical receivers are disposed on or over the driving substrates at positions close to the driving shaft where the moving range is the smallest.

Since the OLED array is able to cause the multi-viewpoint light beams to scan in the rotational direction synchronously with the rotational scanning, electronic rotational scanning may also be used to compensate for the rotational speed of the light-emitting array disposed inside the parallax barrier.

Figure 6:
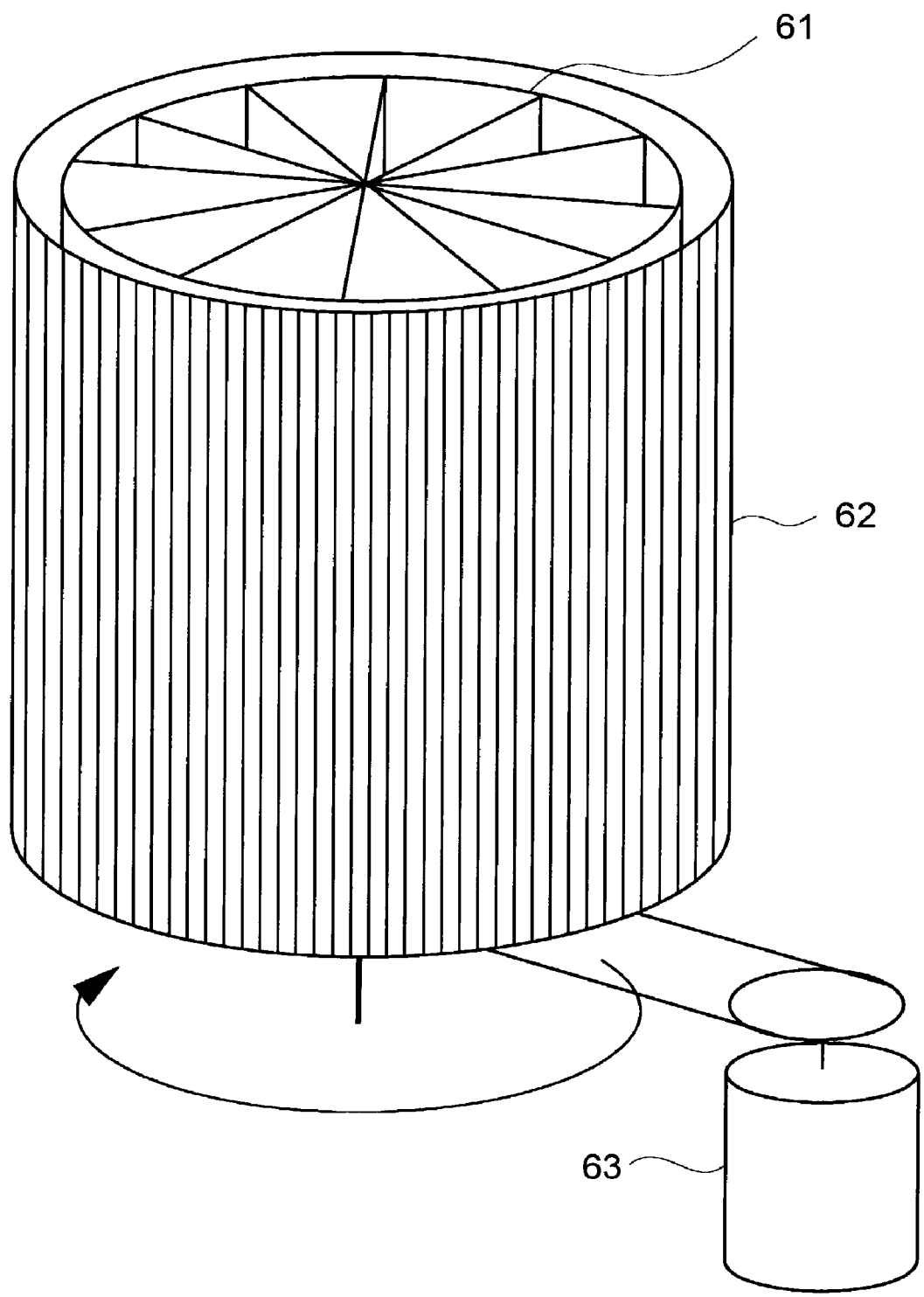
FIG. 6 is a diagram showing another construction of the rotating light-emitting array and the parallax barrier in the stereoscopic display.

FIG. 6 is a perspective view showing the construction of a case in which rotational scanning is obtained by mechanically rotating a parallax barrier 62 disposed at the periphery. Reference numeral 61 denotes a rotating light-emitting array, and reference numeral 63 denotes a DC motor used to rotate the parallax barrier. By rotating the parallax barrier disposed at the periphery, the slit pitch can be changed equivalently. This can be considered as the change in the pitch of interference fringes formed between two rotating slits. Accordingly, by reducing the pitch of the parallax barrier disposed at the periphery, the number of slits, that is, the number of horizontal pixels, can be increased as a result. Therefore, a stereoscopic image with increased definition can be obtained.

Figure 7:
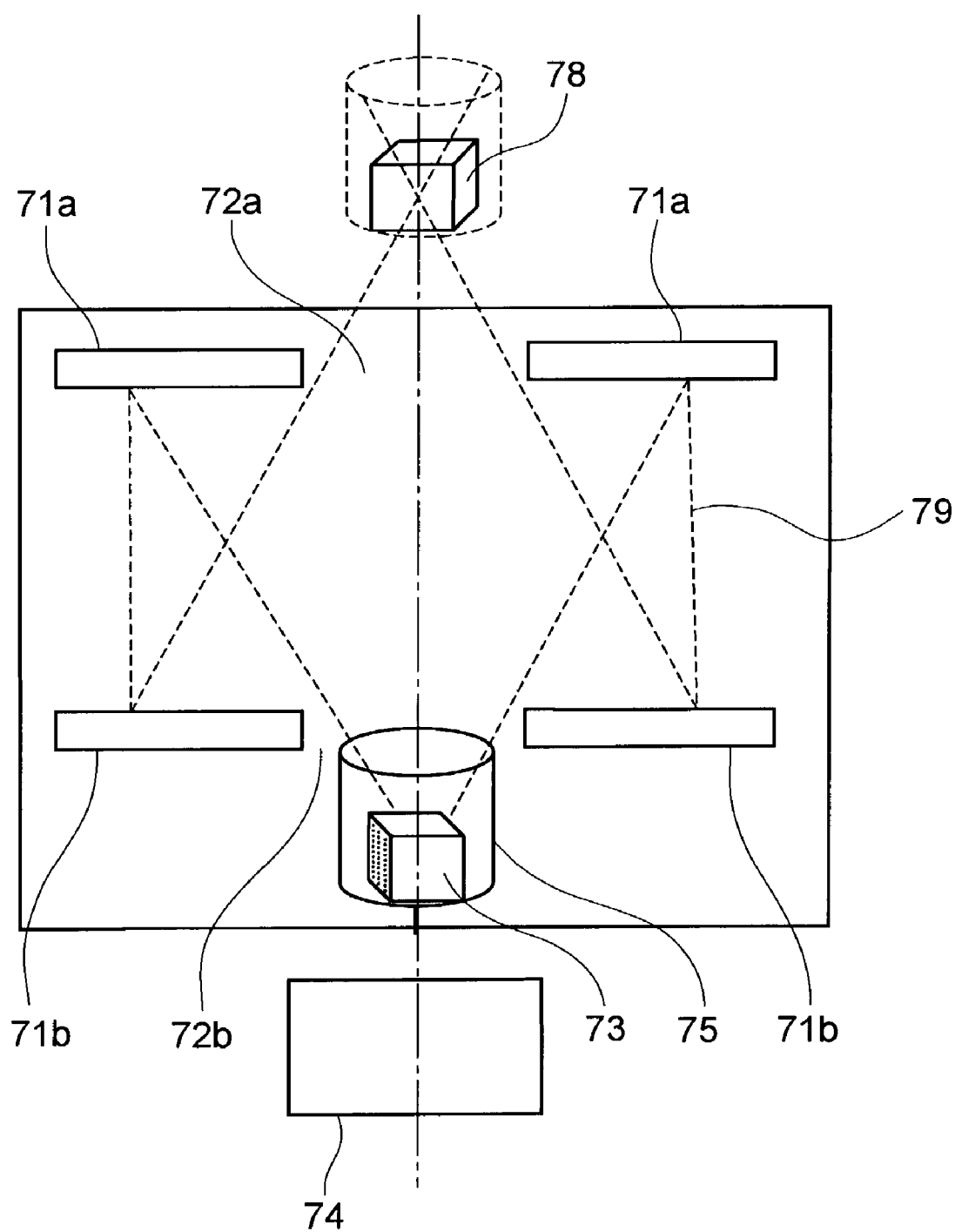
FIG. 7 is a schematic showing another stereoscopic display according to the first embodiment of the present invention.

FIG. 7 is a schematic showing the construction of a case in which a reflective image-forming optical system is used as the image-forming device, and a rotating cylindrical slit-formed unit 75 and a light-emitting array is used as the multi-viewpoint-light-beam-group forming device. A stereoscopic image 73 is reproduced, and a conjugate image 78 of the stereoscopic image 73 is formed outside the image-forming optical system. In the reflective image-forming optical system, two concave mirrors 71a and 71b, which are reflective optical elements, are disposed such that they oppose each other, and apertures 72a and 72b are formed in the concave mirrors 71a and 71b at the central regions thereof. The stereoscopic image 73 formed by the light-emitting array and the cylindrical slit-formed unit is placed close to the lower aperture, and the conjugate image 78 is formed at a position close to the upper aperture. In FIG. 7, although the stereoscopic image 73 is actually a collection of point images reproduced by the multi-viewpoint light beam group, it is shown in a cubic shape in order to facilitate understanding.

The dashed line 79 shows the light beams at the peripheral edge and the dotted chain line shows the optical axis. More specifically, in the present embodiment, concave mirrors having the same focal length are used in the image-forming system, and an OLED array and a parallax barrier similar to those shown in FIGS. 1, 4, and 5 are used as the light-emitting array and the rotating cylindrical slit-formed unit, respectively. In addition, a DC motor is also used as a rotating device 74.

According to the above-described construction, since the conjugate image 78 can be formed outside the image-forming system, a visual effect in which the stereoscopic image appears as if it is floating in the air can be obtained.

Second Embodiment

Figure 8:
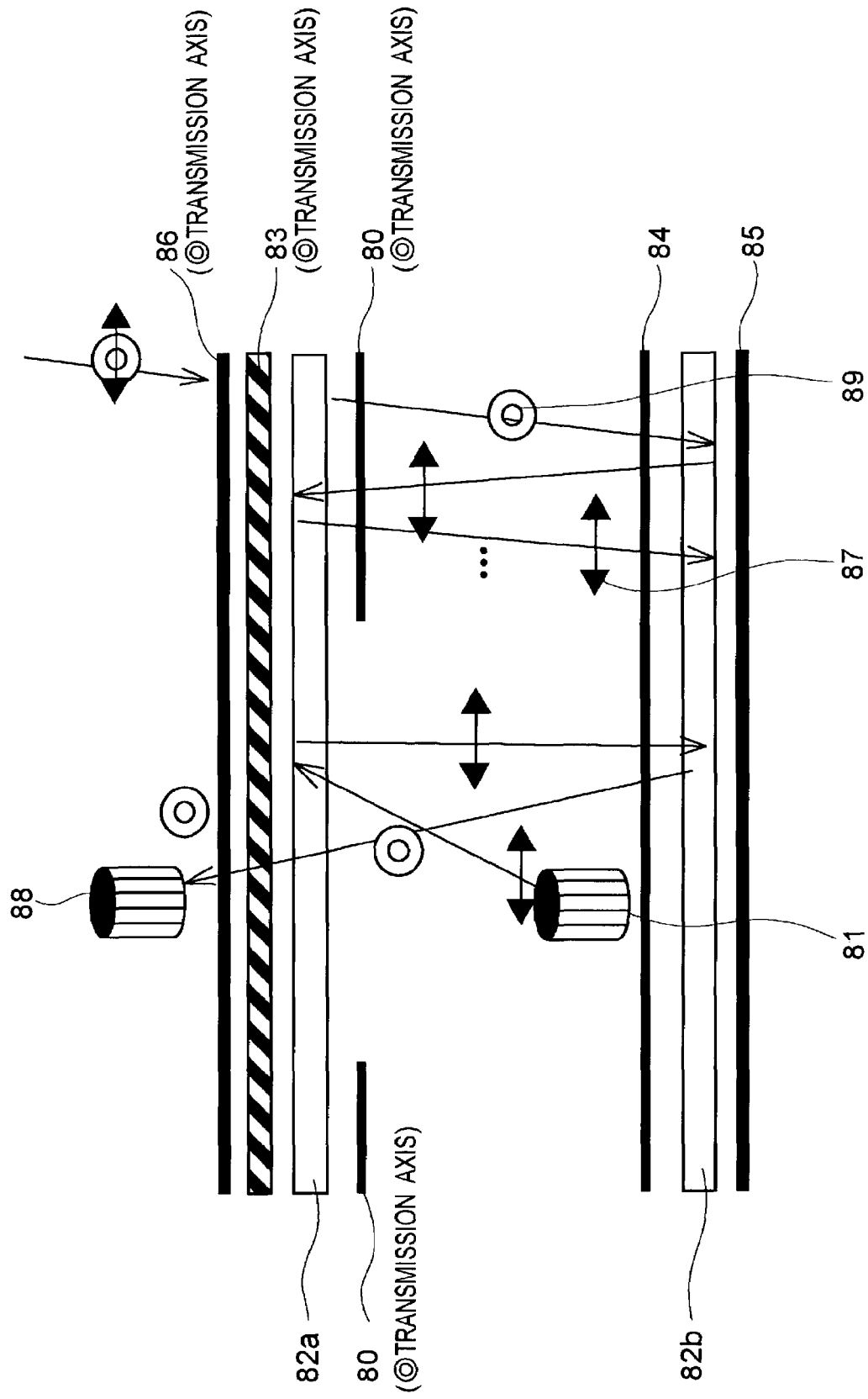
FIG. 8 is a schematic showing a stereoscopic display according to a second embodiment of the present invention.

FIG. 8 is a schematic showing a construction in which a reflective image-forming optical system is used as an image-generating device, a cylindrical slit-formed unit and a rotating light-emitting array are used together as a multi-viewpoint-light-beam-group forming device, and a polarization selecting element and a phase plate are disposed between the multi-viewpoint-light-beam-group forming device and a conjugate image.

The stereoscopic display according to the present embodiment includes a stereoscopic image 81 reproduced by a multi-viewpoint light beam group, image-forming optical elements 82a and 82b which form the reflective image-forming device and serve as convex lenses, a reflection/polarization selecting element 83 which separates polarized light used to form a conjugate image 88, a phase plate 84, and a mirror 85. An upper polarizing element 86 is provided as necessary so that reflection of external light at the reflection/polarization selecting element 83 can be effectively suppressed. In FIG. 8, double-headed arrows 87 indicate that the direction of electric field oscillation of linearly polarized light or the direction of a transmission axis is parallel to the page, and the double circles 89 indicate that the direction of electric field oscillation of linearly polarized light or the direction of a transmission axis is perpendicular to the page.

The reflective image-forming function is obtained by the two optical elements 82a and 82b, which are reflective optical elements which serve as convex lenses, the reflection/polarization selecting element 83, and the mirror 85. The magnification/reduction of the image-forming system can be set on the basis of the size of the reproduced stereoscopic image, the desired size of the conjugate image, the viewing area, and the gap (pitch) of the conjugate parallax image.

Polarized light which is equivalently emitted from point images forming the reproduced stereoscopic image 81 travels through the upper image-forming optical element 82a, and is reflected by the reflection/polarization selecting element 83, which serves to reflect polarized light whose direction of electric field oscillation is the same as the direction of the double-headed arrows 87. Then, the polarized light passes through the phase plate 84 and the lower image-forming optical element 82b disposed at the lower side, and is reflected by the mirror 85. Accordingly, the polarization direction is changed by 90 degrees by the phase plate 84. Then, the polarized light passes through the upper image-forming optical element 82a again, and is incident on the reflection/polarization selecting element 83. The image-forming optical elements 82a and 82b are formed of a material with small birefringence which does not affect the phase change. Since the direction of the transmission axis of the reflection/polarization selecting element 83 is set to the direction perpendicular to the page, as indicated by the double circles 89 in FIG. 8, only the polarized light which has been emitted from the multi-viewpoint light beam group 81 and traveled along the above-described light path can exit to the outside. In addition, since the direction of the transmission axis of the upper polarizing element 86 is set to the direction such that this light is able to pass therethrough, this light can also pass through the upper polarizing element 86. Accordingly, the light which has traveled along the above-described light path forms the conjugate image 88 which can be viewed by an observer.

Since the light emitted from the reproduced stereoscopic image 81 cannot pass through the reflection/polarization selecting element 83, the stereoscopic image 81 cannot be directly observed from above. In addition, the separation of direct light using the polarization thereof considerably increases the viewing direction range. More specifically, compared to the stereoscopic displays disclosed in the U.S. Pat. Nos. 2,628,533, 3,647,284, and 5,508,763, in which direct light and display light used to form an image are separated from each other by forming an opening and limiting the viewing direction, the restriction due to the opening can be removed, so that the image can be viewed from all directions in which the display light is emitted. Accordingly, by using the reflective image-forming system in which the direct light is separated by using the polarization thereof and the aperture size is increased, the viewing area can be increased.

External light, which is not polarized, passes through the upper polarizing element 86 and the reflection/polarization selecting element 83, and enters the reflective image-forming device. The light passes through the phase plate 84 and is reflected by the mirror 85, so that the polarization direction thereof is changed. Accordingly, the light cannot exit to the outside. Although the light is able to exit to the outside after it is reflected once more, in practice, only an extremely small amount of light is able to exit to the outside due to attenuation caused by reflection, reflection at optical elements, etc. In addition, by disposing a lower polarizing element 80 near the reflection/polarization selecting element 83 at the image-forming system side (that is, at the lower side of the reflection/polarization selecting element 83 in FIG. 8), the above-described multiple reflection components can be more effectively absorbed. Thus, noise light caused by external light can be reduced. Accordingly, since external light and direct light can be separated from the light used to form an image, a high-contrast real image can be obtained. In order to facilitate understanding, the polarization state of external light is shown without taking the effect of the lens into account in FIG. 8.

The reproduced stereoscopic image 81 is formed by the device described above in the first embodiment. For example, a parallax barrier and a rotating cylindrical light-emitting array may be used. In such a case, light from the point images forming the stereoscopic image 81 which serves to form the image must be directly emitted as polarized light from the cylindrical light-emitting array, or the light must be polarized by a polarizing element. For example, a polarizing element (polarizing plate) may be disposed at the exit surface of the cylindrical light-emitting array shown in FIG. 4, so that polarized light is emitted therefrom. Alternatively, a polarizing plate may be inserted in the aperture 72b shown in FIG. 7 through which display light externally enters the reflective image-forming system. In addition, even when the reproduced stereoscopic image is formed inside the image-forming system, a polarizing plate should effectively function if it is placed near the parallax barrier so as to cover the light beams that travel toward the reflection/polarization selecting element. For this reason, the position of the stereoscopic image 81 can be freely determined as long as the conjugate image can be formed, and the exact position thereof is not shown in FIG. 8.

More specifically, in the present embodiment, the reflection/polarization selecting element may be formed of, for example, Dual Brightness Enhancement Film (DBEF) (a polarizer produced by 3M) described in International Display Research Conference 1997, p. M-98, a combination of Brightmax (produced by Merck) described in Ekisho Vol. 2, 1998, p. 32, and a quarter-wave plate, a wire-grid polarizer described in SID Digest 2001, pp. 1282–1287, etc. In addition, the image-forming elements included in the reflective image-forming device may be formed of small-birefringence, low-aberration Fresnel lenses, etc., which serve as convex lenses, and a broadband quarter-wave plate is preferably used as the phase plate, for example.

Figure 9:
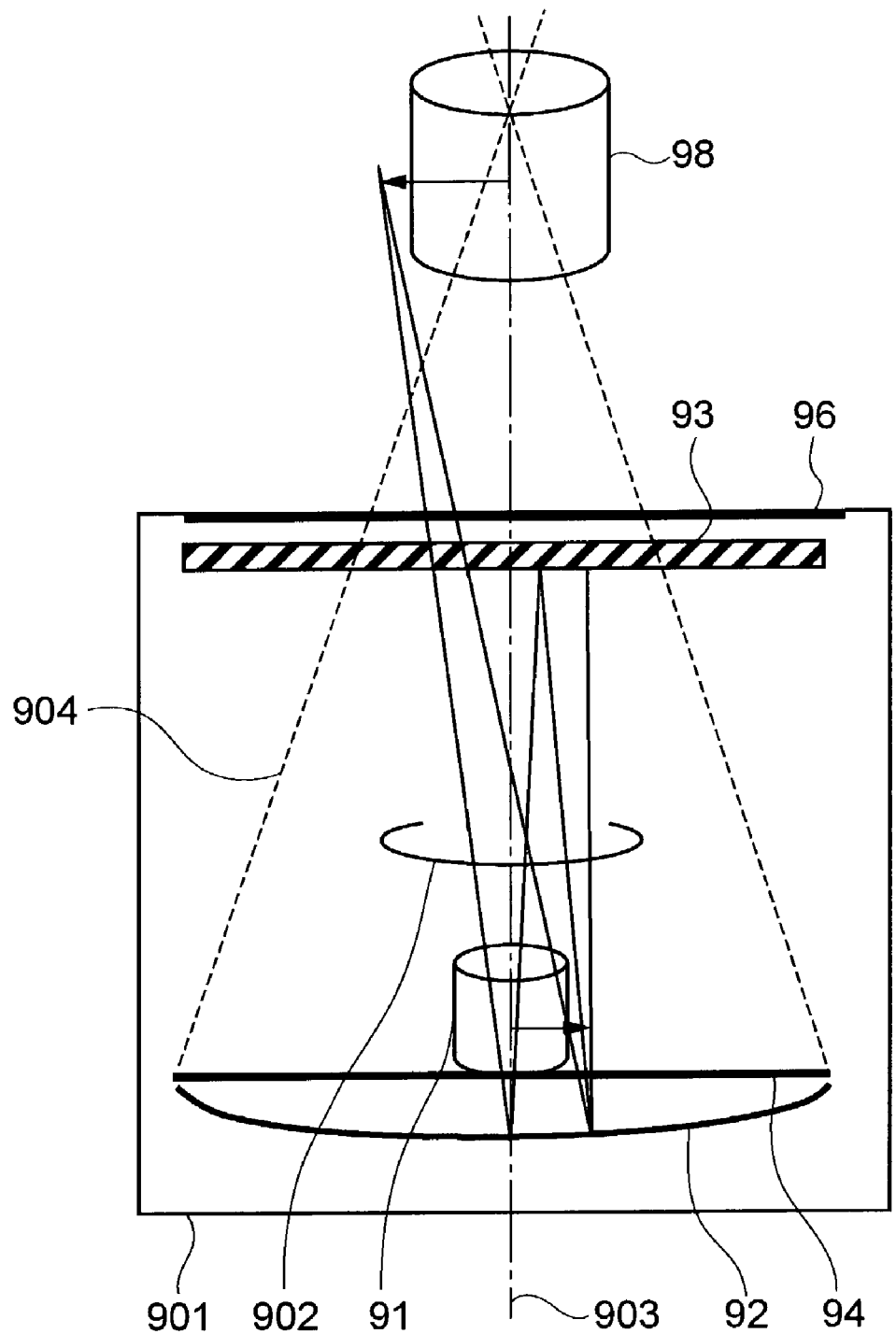
FIG. 9 is a schematic showing a case in which a single image-forming element is used in the stereoscopic display.

FIG. 9 is a schematic showing the construction of a stereoscopic display 901 in which a concave mirror 92, which is a reflective optical element, is used as the reflective image-forming optical system and a DBEF element is used as a reflection/polarization selecting element 93. As shown in FIG. 9, even when a single concave mirror is used, a multi-viewpoint light beam group having 180-degree axial symmetry about an optical axis 903 can be obtained. Polarized display light (parallel to the page) emitted from multi-viewpoint-light-beam-group generating device 91 is reflected by the DBEF element 93 (allows the components perpendicular to the page to pass therethrough). The reflected display light passes through a quarter-wave plate 94 and is reflected by the concave mirror 92. Accordingly, the polarization direction of the display light is changed by 90 degrees. Then, the display light is incident on the DBEF element 93 again. Since the polarization state of the display light is changed such that it is able to pass through the DBEF element 93, the display light passes through the DBEF element 93 and a polarizing plate 96 (transmission axis is perpendicular to the page), and forms a conjugate image 98. In FIG. 9, reference numeral 902 indicates a light beam which is parallel to the optical axis 903 and a light beam which passes through the principal point to show the manner in which the image is formed in the paraxial region. In addition, reference numeral 904 indicates a maximum viewing area determined in accordance with the reflective image-forming optical system. A multi-viewpoint-light-beam-group generating device is formed of a rotating parallax barrier and a rotating cylindrical OLED array device described in the first embodiment, and emits polarized display light through a polarizing plate disposed on the parallax barrier.

When the stereoscopic conjugate image is observed, it appears it is floating in a black background since almost all of external light is absorbed except for the multi-viewpoint light beams. This is because, when the polarizing plate 96 is observed from above, the construction is approximate to that including a quarter-wave plate and a mirror below the polarizing plate, so that external light is absorbed. In addition, the entire body of the stereoscopic display 901 is installed in an optical black box which does not allow external light to enter. In the embodiment shown in FIG. 9, since only the concave mirror is used as the reflective image-forming element, there is an advantage in that expensive components, such as small-birefringence, low-aberration Fresnel lenses, etc., can be omitted.

Third Embodiment

Figure 10:
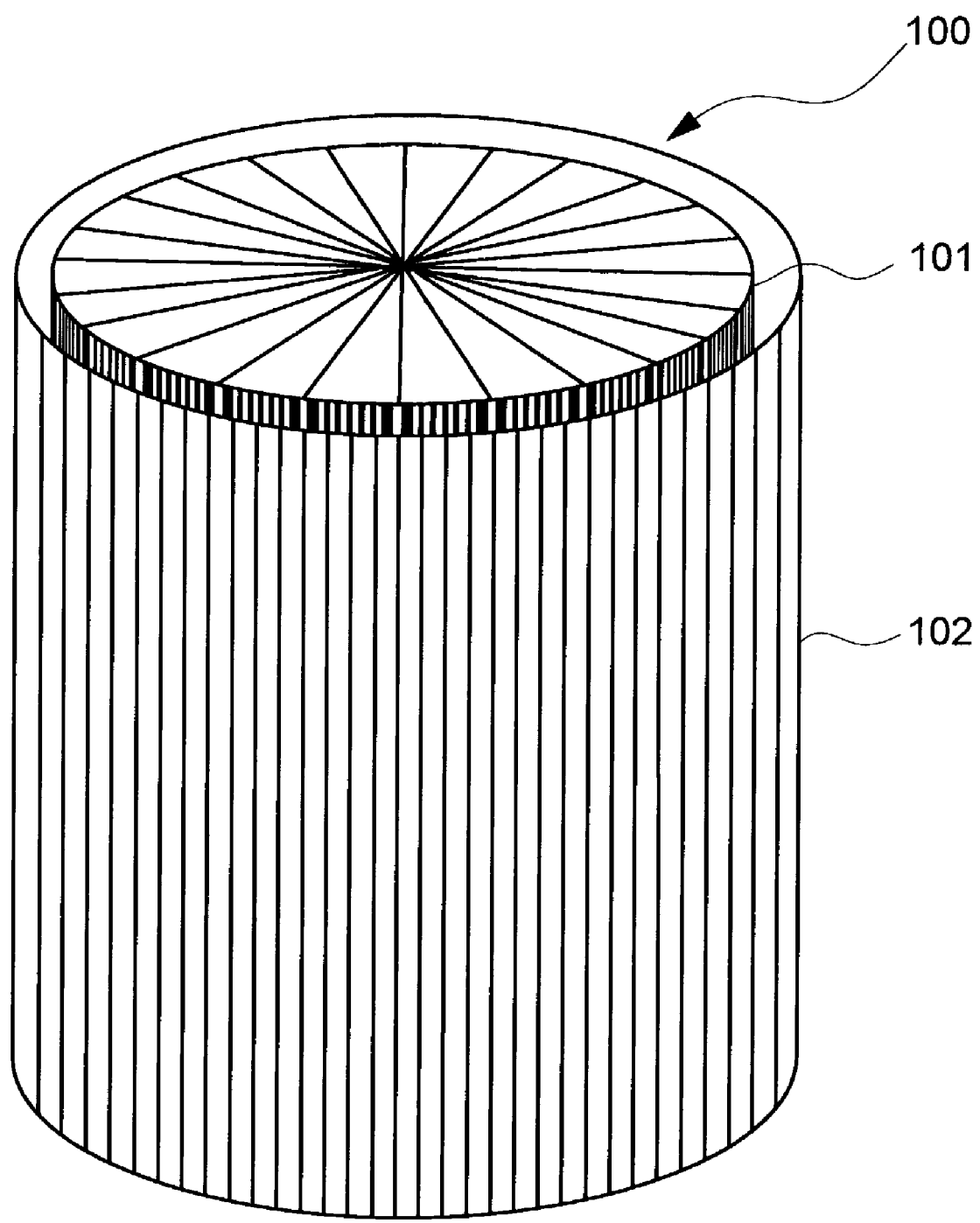
FIG. 10 is a perspective view showing a multi-viewpoint-light-beam generating device according to a third embodiment of the present invention.
Figure 11:
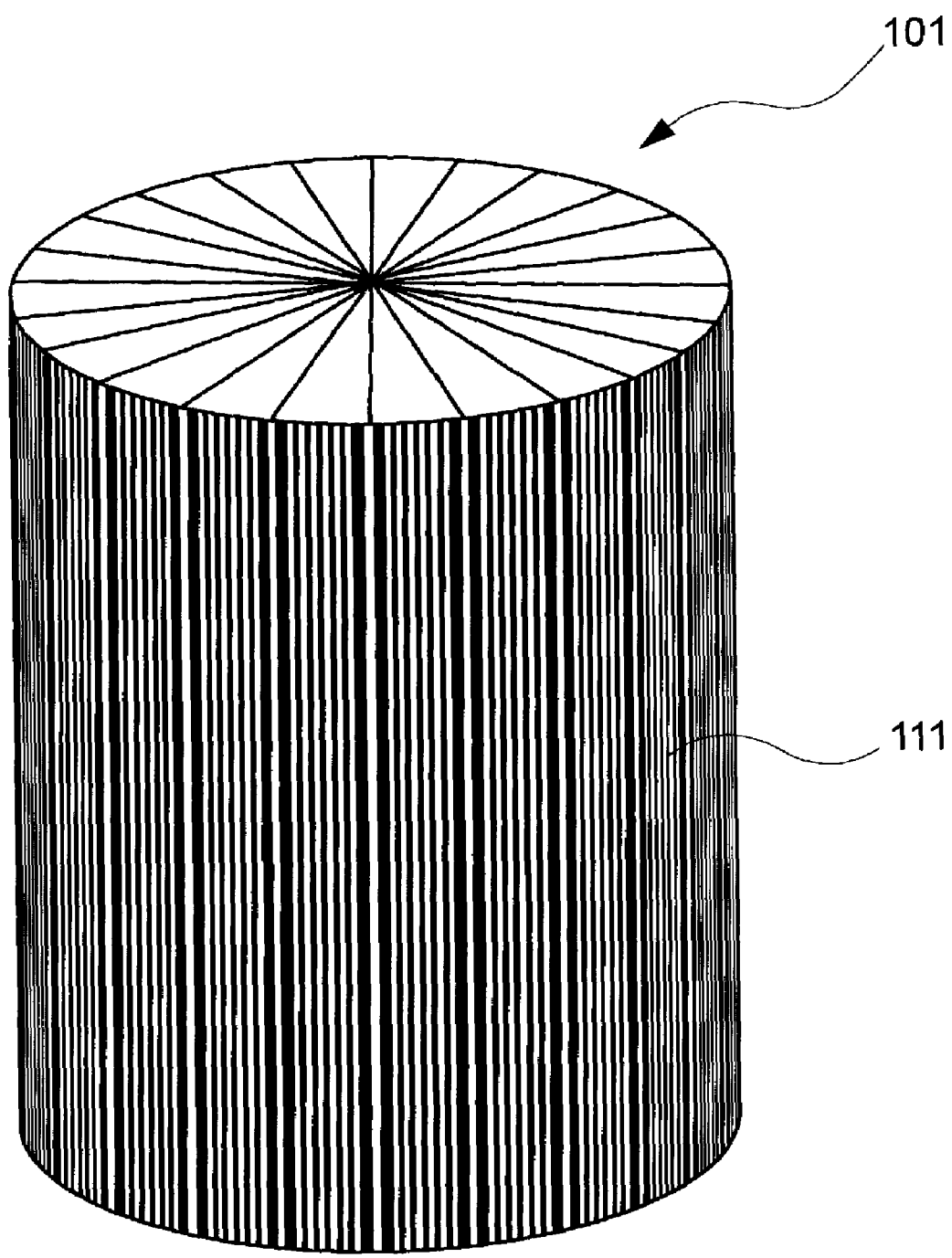
FIG. 11 is a perspective view showing a cylindrical light-emitting array used in the stereoscopic display.

FIG. 10 is a schematic of a multi-viewpoint-light-beam generating device used in the present embodiment. FIG. 11 is a perspective view of a cylindrical light-emitting array shown in FIG. 10.

The multi-viewpoint-light-beam generating device 100 includes a cylindrical parallax barrier 102 disposed at the periphery and a cylindrical light-emitting array 101 disposed inside the cylindrical parallax barrier 102. As shown in FIG. 11, the cylindrical light-emitting array 101 is formed such that two-dimensional light-emitting-array elements 111 are arranged so as to cover almost the entire periphery thereof.

The two-dimensional light-emitting-array elements 111 are preferably formed of thin-film light-emitting elements. A single light-emitting-array element includes 768×128 pixels, and twelve light-emitting-array elements are disposed at the periphery of the cylindrical body. More specifically, the light-emitting-array elements are formed of active-matrix, thin-film, organic light emitting diode (OLED) displays including red (R), green (G), and blue (B) subpixels. Driving circuits for the two-dimensional light-emitting-array elements are disposed inside the cylindrical body. Alternatively, Si-transistor-driven devices described in SID Digest 2001, p. 134, or TFT-driven devices described in SID Digest 2000, p. 974, may also be used, for example.

When the multi-viewpoint light beams can be formed around almost the entire periphery, as shown in FIGS. 10 and 11, it is not necessary to rotate the cylindrical light-emitting array. More specifically, when the light-emitting array shown in FIG. 4 according to the first embodiment, in which the light-emitting area is limited, or a line-shaped light-emitting array is used, the light-emitting array is rotated and multi-viewpoint light beams are successively emitted when the light-emitting array reaches predetermined slit positions. In this case, the light-emitting array rotates faster than afterimages disappear from the observer's eyes. However, in the light-emitting array shown in FIGS. 10 and 11 whose periphery is almost entirely covered, light beams whose emission angles are fixed can be simply displayed, that is, light-emitting patterns can be provided in correspondence with slit positions. Accordingly, mechanical rotation is not necessary.

In order to display the multi-viewpoint light beams in correspondence with each slit for the entire periphery, an extremely high-definition array is necessary. Accordingly, by providing auxiliary rotational scanning in synchronization with electronic scanning of the light-emitting array, multi-viewpoint light beams with an increased number of viewpoints may be generated for each slit. Thus, right and left multi-viewpoint light beams with increased definition can be emitted through the slits, so that a stereoscopic image with higher continuity can be viewed by the observer.

On the contrary, since high-speed rotational scanning of the multi-viewpoint light beams is possible in the OLED array, auxiliary electronic scanning may also be provided in synchronization with mechanical rotational scanning of the light-source array.

The cylindrical light-emitting array may also be formed of nonluminous spatial light modulators (SLMs), such as liquid crystal displays (LCDs), for example. For example, SLMs are arranged in place of the OLED arrays in FIGS. 4, 10, and 11, and a projection light source which emits RGB divergent light is placed at the center of the cylindrical SLM array. In such a projection-type light-emitting array, the nonluminous SLMs function similarly to a self-luminous light-emitting array. In addition, a so-called field-sequential driving method in which RGB light sources flash time sequentially at high speed while an LCD image is changed in synchronization with the flashing can be applied. According to this driving method, compared to LCDs having the same density, a display whose density is effectively increased by three times can be obtained. Furthermore, there is also an advantage in that LCDs can be manufactured more easily as high-density SLMs.

Figure 12:
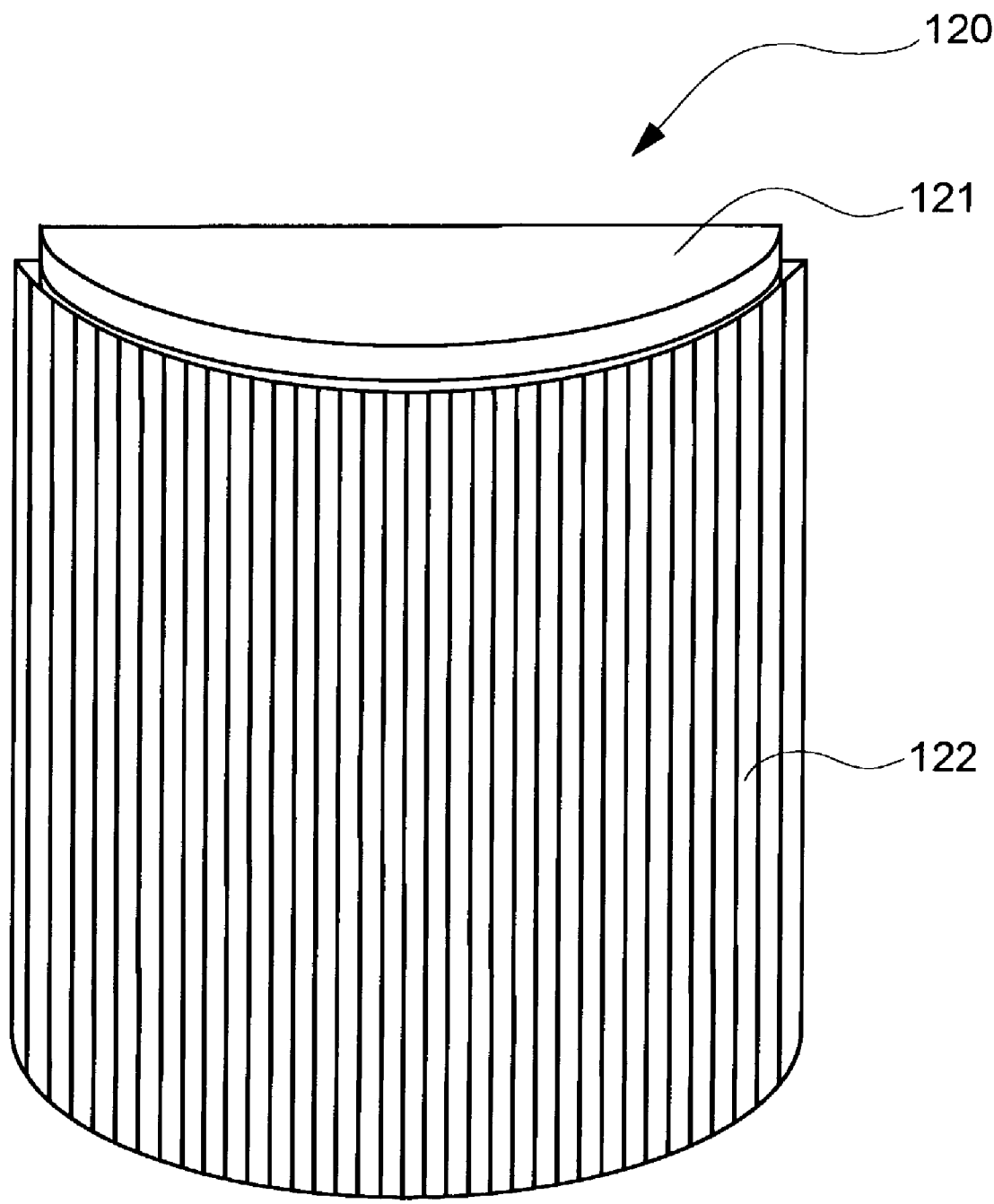
FIG. 12 is a perspective view showing another multi-viewpoint-light-beam generating device according to the third embodiment of the present invention.
Figure 13:
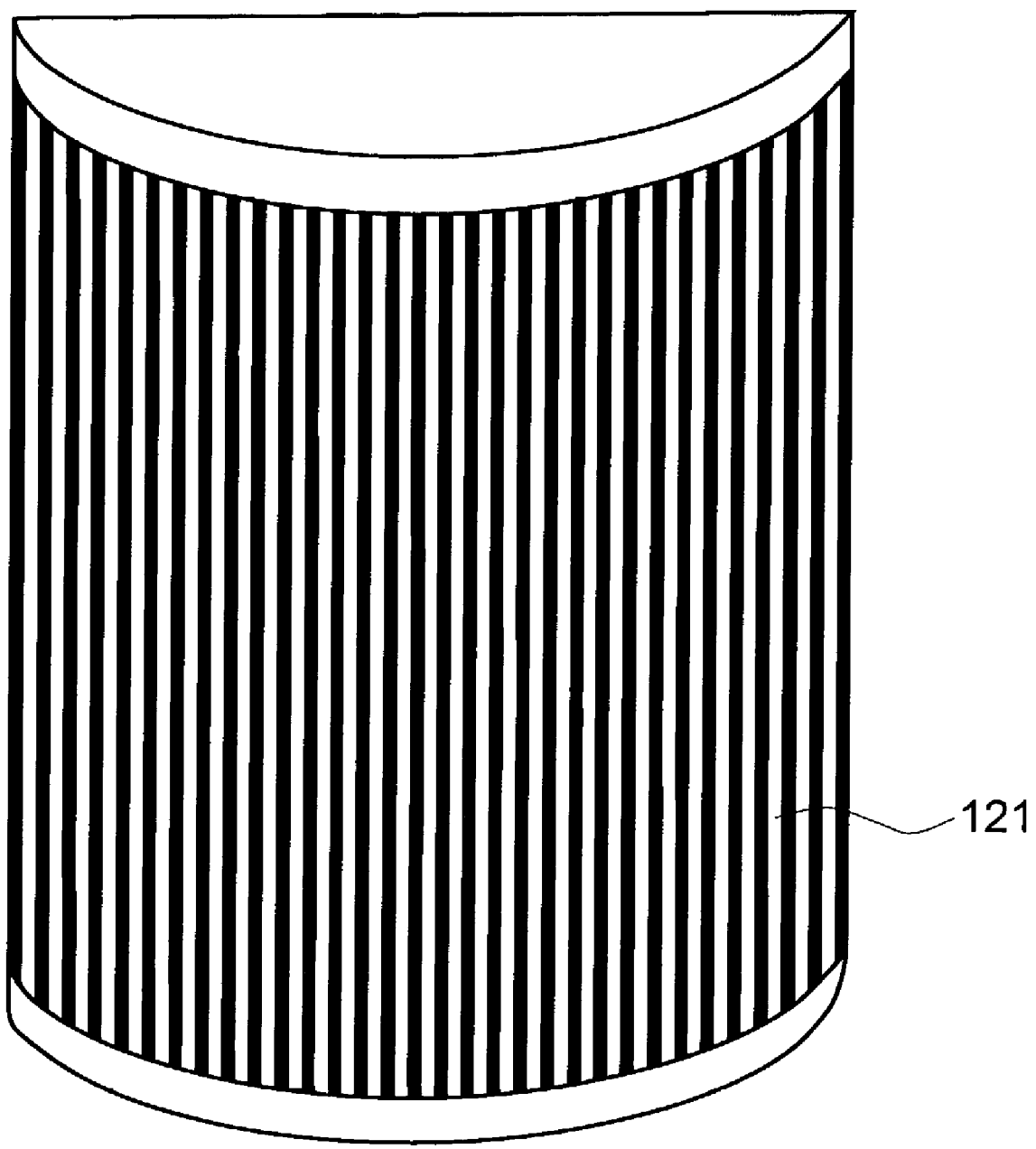
FIG. 13 is a perspective view showing a light-emitting array used in the stereoscopic display.

FIGS. 12 and 13 show an example of a multi-viewpoint-light-beam generating device in which mechanical rotation is not used. FIG. 12 is a perspective view of the multi-viewpoint-light-beam generating device in which mechanical rotation is not used, and FIG. 13 is a perspective view of a light-emitting array.

In the multi-viewpoint-light-beam generating device 120, electronic rotational scanning is provided. When electronic rotational scanning is possible, the shape of the multi-viewpoint-light-beam generating device is not limited by mechanical rotation. The multi-viewpoint-light-beam generating device 120 includes a half-cylindrical parallax barrier 122 and a half-cylindrical light-emitting array 121. In FIG. 12, the viewing area of the multi-viewpoint light beams is within the approximately 180 degrees in which the half-cylindrical parallax barrier 122 is formed. Therefore, a stereoscopic conjugate image formed by an image-forming system faces the opposite side.

As shown in FIG. 13, the half-cylindrical light-emitting array 121 is constructed by forming an OLED display having a flexible substrate in a half-cylindrical shape. The OLED display is constructed by disposing an OLED layer between high-barrier films to seal against harmful gasses such as water vapor, and is driven by active-matrix method. Red, green, and blue color light-emitting materials are arranged at 100 µm pitch, so that a high-definition, full-color moving image can be formed in a cylindrical region. In addition, as described above, the multi-viewpoint light beams are electronically rotated along the periphery. Accordingly, fully electronic rotation is possible, so that mechanical rotation is unnecessary.

The half-cylindrical light-emitting array 121 may also be formed by arranging a plurality of array elements similarly to the two-dimensional light-emitting-array elements according to the third embodiment shown in FIG. 11. In addition, the light-emitting array may also be constructed as a projection type in which light beams are emitted by using nonluminous SLMs and a light source.

Although FIGS. 12 and 13 show the barrier and the light-emitting array formed in the half-cylindrical shape, the shapes thereof are not limited as long as the rotational scanning is performed in an effective area of the viewing direction range.

Similarly to the stereoscopic displays shown in FIGS. 1, 7, 8, and 9, the overall construction of the stereoscopic display includes a reflective image-forming optical system and a multi-viewpoint-light-beam generating device including a parallax barrier and a cylindrical light-emitting array which is mechanically or electronically rotated or a partially cylindrical light-emitting array. Accordingly, a conjugate image of a stereoscopic image reproduced by a multi-viewpoint light beam group without using mechanical rotational scanning, or without high-speed rotational scanning, can be observed. In addition, a highly stable, high-definition stereoscopic moving image can be obtained.

[Advantages]

As described above, according to the present invention, a stereoscopic display having a visual effect in which the stereoscopic moving image appears it is floating in air can be obtained. In addition, high-definition multi-viewpoint light beams can be easily utilized and a highly-realistic stereoscopic conjugate image can be reproduced in space.

In addition, since a luminous color matrix array can be used as a source of the multi-viewpoint light beams, a full-color moving conjugate image can be reproduced.

Furthermore, the viewing area can be magnified by separating the display light by using the polarization thereof or by using a reflective image-forming system with a large aperture, so that the image can be viewed by many people at the same time. Accordingly, the stereoscopic display of the present invention may be used in the medical field and industry, games, and for various other applications.

Since the mechanical rotational scanning system is separated from the display area and the rotating unit basically cannot be directly viewed or touched by the viewer, safety is ensured.

In addition, since the conjugate image of the stereoscopic image is electronically reproduced by the multi-viewpoint light beams, no real object exists in the display space. Therefore, haptic sensing devices, such as a pointer, can be inserted into the space in which the conjugate image is reproduced. For example, it is possible to bring a pointer into contact with the inside of a computed tomography (CT) image, and generate a tactile feeling at that point. Thus, a stereoscopic display having good compatibility with kinesthetic sensing devices can be obtained.

In addition, mechanical vibration does not occur when the light-emitting array itself is electrically rotated, so that a quiet, highly-stable image can be obtained. When electronic rotational scanning is provided, mechanical rotation is not necessary. In addition, the shapes of the barrier and the light-emitting array are not limited because of the mechanical rotation.

Furthermore, when the thin-film light-emitting-array elements are used, the weight of the rotating unit can be reduced.

In addition, since so-called phantom images do not appear in parallax stereoscopic displays, three-dimensional moving images of color-filled objects can be obtained.

In addition, noise light can be suppressed by using the polarization selecting element, so that a stereoscopic display capable of forming high-contrast images can be obtained.

What is claimed is:

1. A stereoscopic display, comprising:
    a multi-viewpoint-light-beam-group generating device which generates an electronically-formed, multi-viewpoint light beam group; and
    an image-forming device which reproduces a conjugate image of a stereoscopic image formed by the multi-viewpoint light beam group;
    the multi-viewpoint-light-beam-group generating device including a cylindrical parallax barrier and a cylindrical light-emitting array;
    electronic scanning being performed on the cylindrical light-emitting array by electronically activating and deactivating the multi-viewpoint light beams along a periphery of the cylindrical light-emitting array in a rotational direction; and
    the cylindrical light-emitting array being formed such that two-dimensional light-emitting-array elements are arranged so as to cover almost an entire periphery of the cylindrical light-emitting array.

2. The stereoscopic display according to claim 1, the image-forming device being an optical system including a polarizing element which polarizes light which serves to form the conjugate image and a polarizing element which selects display light.

3. The stereoscopic display according to claim 1, the image-forming device including a polarizing element which is formed of a polarization separation mirror and which selects display light, and a polarization rotation element which rotates polarized light reflected by a concave mirror.

4. The stereoscopic display according to claim 1, the multi-viewpoint-light-beam-group generating device including a partially cylindrical parallax barrier in which a viewing direction is limited and a partially-rotating cylindrical light-emitting array.

5. The stereoscopic display according to claim 1, the cylindrical light-emitting array including array elements formed of thin-film light-emitting elements.

6. The stereoscopic display according to claim 1, the cylindrical light-emitting array including array elements formed of thin-film organic light-emitting diodes.

7. The stereoscopic display according to claim 1, the cylindrical light-emitting array being driven by a display signal obtained by optical transmission.

8. The stereoscopic display according to claim 1, the cylindrical light-emitting array being provided with optical louvers which limit the direction of light emission.

9. The stereoscopic display according to claim 1, the cylindrical light-emitting array being provided with a polarizing element used to emit polarized light.

10. The stereoscopic display according to claim 1, an exterior of the cylindrical light-emitting array being at least one of covered and sealed with black resin except for regions where light-emitting-array elements are formed.

11. The stereoscopic display according to claim 1, the cylindrical light-emitting array including non-luminous spatial light modulators and a projection light source.

12. The stereoscopic display according to claim 1, an image signal applied to the cylindrical light-emitting array being a multi-viewpoint light beam signal having 180-degree axial symmetry with respect to a rotational axis of the cylindrical light-emitting array.

13. The stereoscopic display according to claim 1, the cylindrical parallax barrier being provided with optical louvers.

14. The stereoscopic display according to claim 1, the cylindrical parallax barrier capable of rotating to change a pitch of interference fringes formed between at least two slits and thereby alter light beams of the multi-viewpoint light beam group generated by the rotating cylindrical light-emitting-array.

15. A stereoscopic display, comprising:
    a multi-viewpoint-light-beam-group generating device which generates an electronically-formed, multi-viewpoint light beam group; and
    an image-forming device which reproduces a conjugate image of a stereoscopic image formed by the multi-viewpoint light beam group;
    the multi-viewpoint-light-beam-group generating device including a cylindrical parallax barrier and a cylindrical light-emitting array,
    electronic scanning being performed on the cylindrical light-emitting array by electronically activating and deactivating the multi-viewpoint light beams along a periphery of the cylindrical light-emitting array in a rotational direction, and
    the cylindrical light-emitting array being formed such that two-dimensional light-emitting-array elements are arranged so as to cover almost the entire periphery thereof,
    the two-dimensional light-emitting-array elements being formed of thin-film light emitting elements.

16. A stereoscopic display, comprising:
    a multi-viewpoint-light-beam-group generating device which generates an electronically-formed, multi-viewpoint light beam group; and
    an image-forming device which reproduces a conjugate image of a stereoscopic image formed by the multi-viewpoint light beam group;
    the multi-viewpoint-light-beam-group generating device including a cylindrical parallax barrier and a cylindrical light-emitting array,
    electronic scanning being performed on the cylindrical light-emitting array by electronically activating and deactivating the multi-viewpoint light beams along a periphery of the cylindrical light-emitting array in a rotational direction; and
    an emission angle of each of the multi-viewpoint light beams being fixed.

* * * * *